May 16, 1933.  O. H. BANKER  1,909,330
STEERING GEAR
Filed Nov. 20, 1931   3 Sheets-Sheet 1

Inventor
Oscar H. Banker
Quarles & French
Attorneys

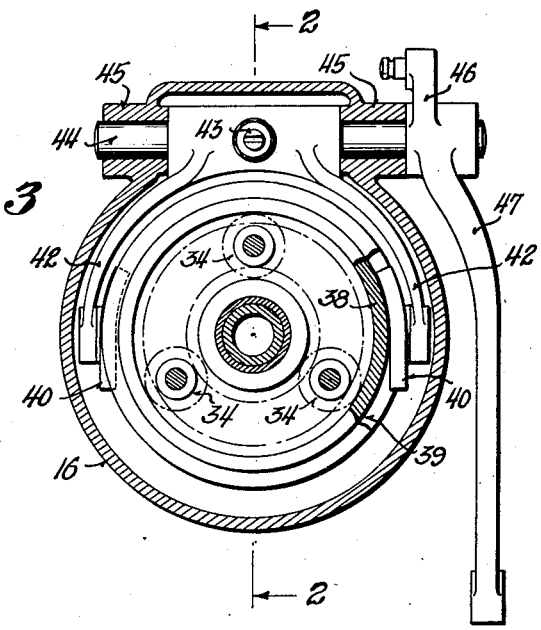

Patented May 16, 1933

1,909,330

UNITED STATES PATENT OFFICE

OSCAR H. BANKER, OF CHICAGO, ILLINOIS, ASSIGNOR TO NEW PRODUCTS CORPORATION, OF CHICAGO, ILLINOIS, A CORPORATION OF DELAWARE

STEERING GEAR

Application filed November 20, 1931. Serial No. 576,263.

The invention relates to steering gears.

In the use of an automobile equipped with the so-called balloon tires, steering has been rendered difficult because of the increased effort necessary on the part of the operator to operate the steering mechanism while in close quarters, as in parking. Some proposals to overcome this difficulty by the use of multi-speed gearing arrangements have been made but so far as I am aware such proposals have not been adopted in passenger vehicles because, as I believe, the arrangements heretofore proposed, aside from the complications in the gearing mechanism, are not so designed as to be readily manipulated or controlled by the operator and the gearing may be left in low speed gear ratio when the conditions are such that it should not be. One of the objects of the present invention is to provide a multi-speed gearing arrangement for readily increasing the force applied to the steering gear which is so controlled that there is no danger of holding the mechanism in low gear at times when it is not needed and where in the natural sequence of events in driving the automobile the operator will release the low speed gearing connection in his operation of bringing the vehicle to a higher speed.

A further object of the invention is to provide a steering gear mechanism embodying a novel, simple and effective gearing arrangement.

The invention further consists in the several features hereinafter set forth and more particularly defined by claims at the conclusion hereof.

In the drawings, Fig. 1 is a side elevation view of steering mechanism embodying the invention;

Fig. 3 is a detail sectional view taken on the line 3—3 of Fig. 2;

Fig. 4 is a view similar to Fig. 2, showing certain modification;

Figure 1:
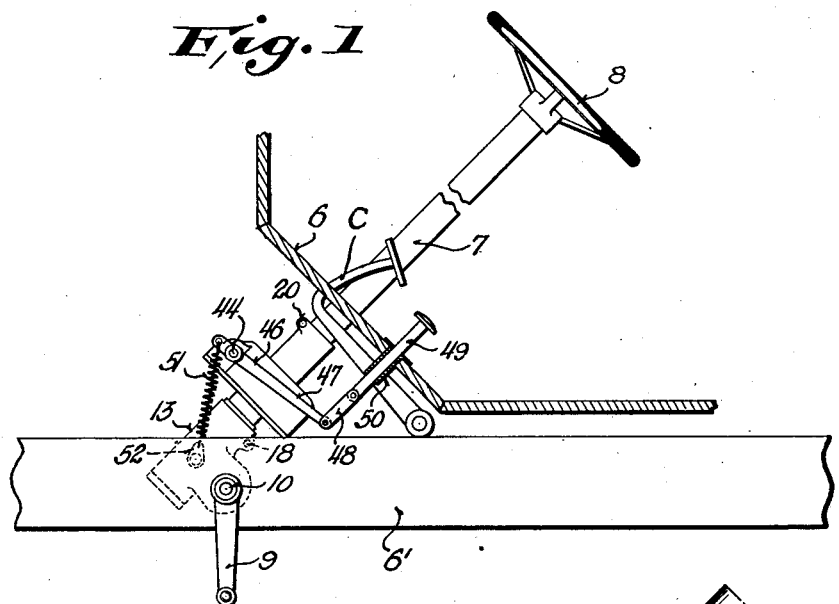
Figure 2:
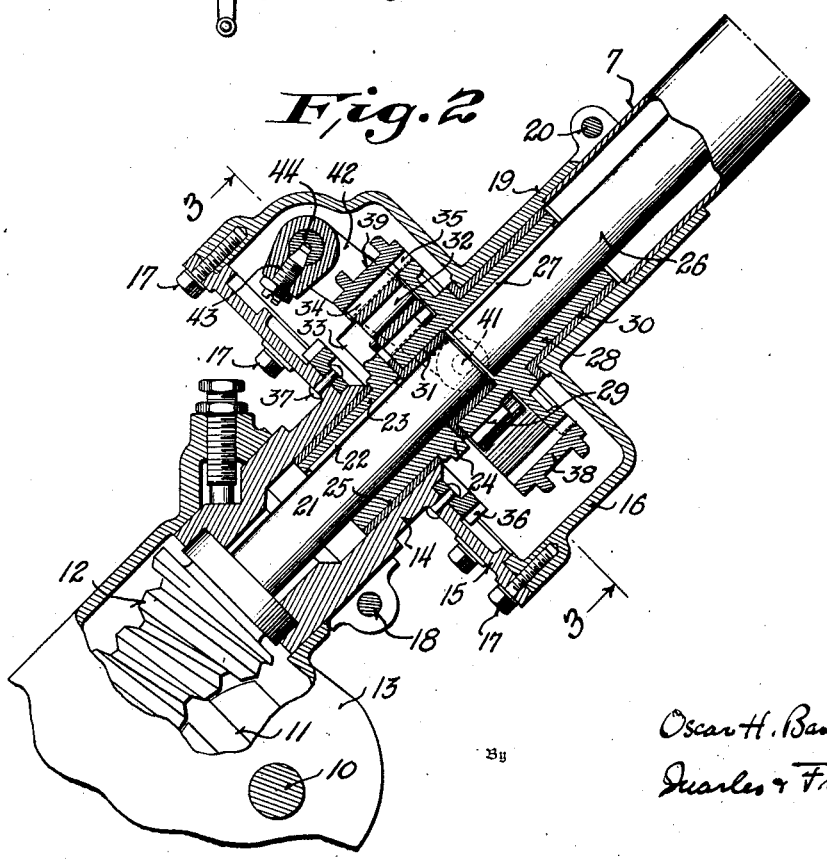
Fig. 2 is a view generally in vertical section through the mechanism shown in Fig. 1, the section being taken along the line 2—2 of Fig. 3.

Referring to Figs. 1 and 2 of the drawings the numeral 6' designates the side frame member of an automotive vehicle, 6 the dash, 7 the steering column, 8 the steering wheel, and 9 the steering arm which is mounted on a shaft 10 connected by the usual steering gears 11 and 12 mounted in a casing 13. The steering column 7 is usually supported by a suitable connection not shown with the dash.

Referring to Figs. 2 and 3, the casing 13 is secured to the lower end of a sleeve 14 having a flanged portion 15 forming the base of a two part casing. The other part 16 of this casing is secured to said flanged portion 15 by bolts 17. The upper end of the casing 13 has a split hub connection with the sleeve 14 clamped thereto by a bolt 18 and the upper tubular end 19 of the casing section 16 has a similar connection with the steering column and is clamped thereto by the bolt 20.

A shaft member 21 is formed integral with or connected to the gear 12 and is keyed by the key 22 to the hub 23 of a gear carrier 24, said hub being journalled in a bearing bushing 25 in the sleeve 14 and hence centering the shaft member 21 therein.

A shaft member 26, to which the steering wheel 8 is connected, extends down through the stationary steering column 7 and is connected by a key 27 to the hub 28 of a gear 29, the upper portion of said hub being journalled in a bearing bushing 30 in the end 19 of the casing section 16 and the lower portion of said hub provided with a bearing bushing 31 in which the upper end of the shaft member 21 is free to turn.

The gear carrier 24 has shafts 32 mounted in arms 33 and gears 34, in the nature of planet gears, are mounted on these shafts 32 and mesh with the gear 29.

A lock gear 35 is formed integral with or connected to the hub 28 of the gear 29 and a lock gear 36, similar to the gear 35, is secured to the stationary portion of the device as by rivets 37 to the flanged portion 15 of the two part casing previously described.

A shiftable annular gear 38 has teeth adapted to mesh with the planet gears 34 and to selectively mesh with either the gear 35 or the gear 36 and has an annular grove 39 formed on its outer surface in which the blocks 40, pivotally connected by pins 41 to arms of a shifter fork 42, are mounted.

The hub of the shifter fork 42 is secured by a set screw 43 to a pivot shaft 44 mounted to turn in bosses 45 formed in the casing section 16 and its exterior end has a lever 46 secured thereto, one end 47 of which is operatively connected by a link 48 to the lower end of a foot operated member 49, here shown in the form of a push pedal slidably mounted in a bearing 50 in the dash 6, the other end of said lever being connected to one end of spring 51 which is anchored to a fixed part at its other end as indicated at 52.

With the above construction, when the shift gear 38 is in the position shown in Fig. 2, in which its teeth are in mesh with the gears 34 and the gear 35 and in which position it is normally maintained by the action of the spring 51 through the lever 46, shaft 44 and fork 42, the mechanism is in the high gear ratio as under these conditions the turning of the shaft 26, on the turning of the wheel 8, will turn the gears 29, 35 and 38 and consequently the gears 34 as a unit and thus cause the shaft member 21 to turn as a unit with the shaft 26. If now under certain conditions of driving a low gear ratio or greater leverage for steering is needed, the operator presses down on the pedal or member 49 and thus through the link 48, lever 46, shaft 44 and fork 42 shifts the gear 38 from the position shown in Fig. 2 to a position in which said gear 38 is moved out of mesh with gear 35 and into mesh with the gear 36 while remaining in mesh with the gears 34. Under these conditions the turning of the shaft 26 will, through the gear 29, turn the gears 34 and cause these gears to turn about the stationary gear 38 and in doing so turn the shaft 21 at a lower speed but with increased force applied through the gearing and as soon as the operator withdraws his foot from the member 49, the mechanism is shifted back into the position shown in Fig. 2 and as hereinafter explained this release of the member 49 is brought about to establish the high gear ratio in the ordinary events incident to the operation of the other controls of the vehicle.

The modified construction shown in Fig. 4 performs the same general functions as that previously described and is controlled in a similar manner but instead of a planetary gearing I have provided a spur gearing arrangement associated with the shafts 21 and 26 and mounted in a casing 53 having a removable plate section 54 secured to the main casing by bolts 55.

In this modified form the shaft member 21 has a sleeve 56 secured thereto by a key 57 and the hub 58 of a shiftable gear 59 is slidably keyed to this sleeve by splines 60 and the shaft member 26 has a gear member 61 secured thereto by the key 62. This gear member 61 has a clutch gear portion 63 formed by extensions of its teeth and adapted to engage the teeth of an internal clutch gear 64 formed in the hub of the gear 61 so that when these clutch gears are engaged it will be obvious that the shafts 21 and 26 are connected to turn directly together as the shaft 26 is turned by the operator's turning of the steering wheel and the mechanism is in the high gear ratio.

For obtaining the low gear ratio, a pair of compound gears 65, 66 have their hub 67 journalled on a shaft 68 removably mounted in the casing 53 and in the form of a bolt provided with a nut 69, the gear 65 being in constant mesh with the gear 63 while the gear 66 of smaller diameter is adapted to mesh with the gear 59 when the same is shifted to unclutch the clutch gears 63 and 64, the ratio of the gearing being such as to increase the turning force on the shaft 21 under these conditions.

The shiftable gear 59 has an annular groove 70 in which the ends of a shifter fork 71 are operatively mounted in the same way as the shifter fork 42 is associated with the groove 39 of the gear member 38, previously described, and this fork 71 is secured to a shaft 72, similar to the shaft 44, and similarly controlled through a foot operated lever and spring which because of their identity with the parts 46, 47, 49 and 51 shown in Fig. 1 have not been specifically shown in Fig. 4, it being noted that the spring, such as 51, acts through the lever such as 46, to turn the shaft 72 and fork 71 to normally hold the gears in the direct or high gear ratio as shown in Fig. 4 but which when the operator turns the shaft 72 by the down pressure on the pedal such as 49, will act to establish the low gear ratio by shifting the clutch gear 63 and 64 out of mesh and bringing the gear 59 into mesh with the gear 66, the drive from the steering shaft 26 then being through gears 61, 65, 66 and 59 to the shaft 21.

As shown in Fig. 1 the clutch pedal C is at the left hand side of the steering column in its usual position and the pedal 49 is in front of the clutch pedal and hence further to the left and the other control pedals not shown, such as the brake and accelerator are at the right of the steering column. Thus, when the vehicle is parked at the curb, the operator puts his left foot on the pedal 49 and operates the steering mechanism above described to turn the wheels and as he throws out the clutch as in starting the engine he will remove this foot from the pedal 49 so as to operate the clutch and consequently in the natural course of events in driving his foot will not be left upon the pedal 49 to keep the steering gear in low gear and the spring 51 will act through the connections above described to maintain the gearing of either of the forms of the invention in high gear.

Figure 5:
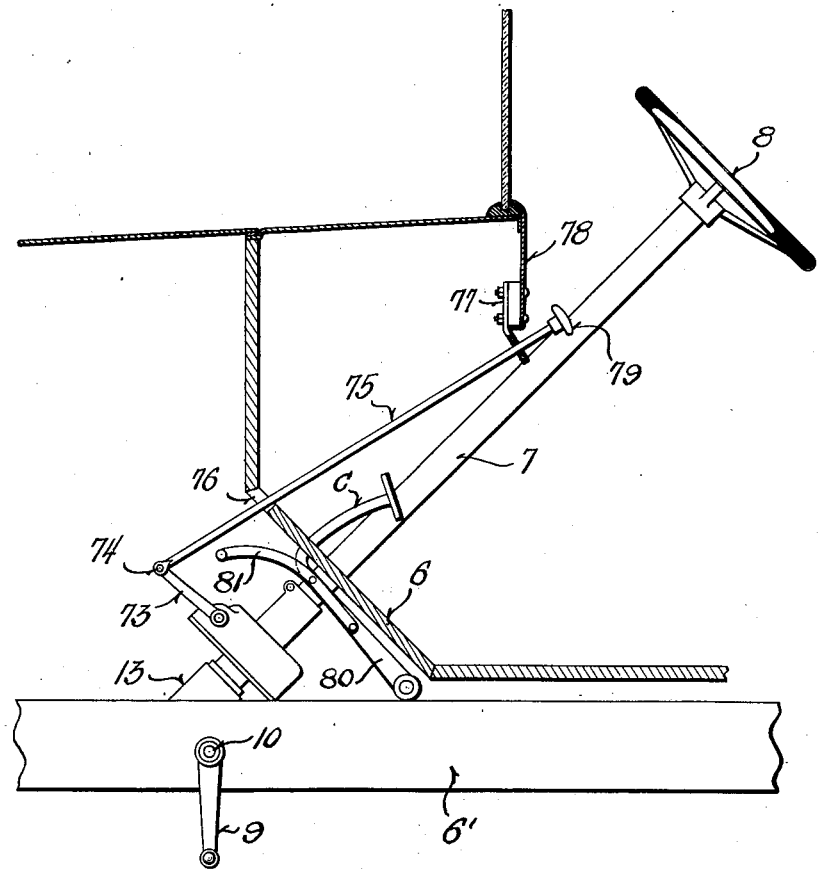
Fig. 5 is a view similar to Fig. 1 showing certain modifications in the controls.

In Fig. 5 I show the preferred form of control for the shifting mechanism wherein the shaft 44 or 72 is provided with an arm 73 that is pivotally connected at 74 with a pull rod 75 that extends up through an opening 76 in the foot board portion of the dash and through a guide bracket 77 secured to the instrument board portion 78 of the dash and has a button 79 adjacent the steering wheel 8 within convenient reach of the operator's hand whereby he may pull upwardly on this rod to turn the shaft 44 or 72 so as to shift the gearing from a high to a low speed ratio. The clutch pedal C carrying an arm 80 whose lower end portion 81 is disposed to move in the path of the arm 73 so that when the operator presses down on the clutch pedal C to disengage the clutch, if the arm 73 is in its upper or low gear position it will be pushed downwardly during a portion of this movement to bring the arm 73 back to the high gear ratio position and thus turn the shaft 44 or 72 to shift the gearing previously described to this position. Thus, when the vehicle is parked at the curb, the operator may pull up on the rod 75 to shift the steering mechanism to the low gear ratio and operates the steering mechanism above described to turn the wheels, and as he throws out the clutch, as in putting car in low gear and reverse, he presses down on the clutch pedal C which through the arm 80 acts on the arm 73 to return the gearing to its high gear ratio so that the operator unconsciously sets the gearing in its proper position for driving conditions so that he cannot forget to bring the gearing to this high gear position.

I desire it to be understood that this invention is not to be limited to any particular form or arrangement of parts except in so far as such limitations are included in the claims.

What I claim as my invention is:

1. In an automotive vehicle, the combination with one of the driving controls of the vehicle, of a pair of steering gear shafts, a change speed gearing connection between said shafts including a shiftable gear member, a control member operatively connected to said gear member for shifting the same into a high or low speed ratio, means operable, through said driving control, upon said control member to move the same to shift said gear member into the high gear ratio, and other means under the control of the operator to move said control member to shift said gear member into the low gear ratio.

2. In an automotive vehicle, the combination with the clutch controlling member of the vehicle, of a pair of steering gear shafts, a change speed gearing connection between said shafts including a shiftable gear member, a control member operatively connected to said gear member for shifting the same into a high or low speed gear ratio, means operable by said clutch controlling member, for operating said control member to move the same to shift said gear member into the high gear ratio, and other means under the control of the operator to move said control member to shift said gear member into the low gear ratio.

3. In a vehicle steering gear mechanism, the combination of a pair of alined shafts, a support, a drive gear and a lock gear on one of said shafts, a gear carrier on the other of said shafts carrying planet gears meshing with said drive gear, a lock gear mounted on said support, a shiftable orbit gear meshing with said planet gears and having internally disposed teeth movable into selective locked relation with said lock gears respectively while meshing with said planet gears, and means under the control of the operator for shifting said orbit gear.

4. In a vheicle steering gear mechanism, the combination of a pair of alined shafts, a support, a drive gear and a lock gear on one of said shafts, a gear carrier on the other of said shafts carrying planet gears meshing with said drive gear, a lock gear mounted on said support, a shiftable orbit gear constantly in mesh with said planet gears and having its orbit teeth shiftable into mesh with said lock gear on one of said shafts for locking the gearing for the direct turning of both of said shafts and having its orbit teeth shiftable into mesh with the lock gear mounted on said support for a low gear ratio, a shifter member operatively connected with said orbit gear, and means for controlling said shifter member.

5. In an automotive vehicle, the combination with the clutch controlling member of the vehicle, of a pair of steering gear shafts, a change speed gearing connection between said shafts including a shiftable gear member, means for shifting said gear member into a low speed gear ratio, and means operable, when the operator moves the clutch controlling member to disengaging position, to shift said gear member into the high gear ratio.

In testimony whereof, I affix my signature.

OSCAR H. BANKER.